(12) United States Patent
Hague

(10) Patent No.: US 6,718,124 B2
(45) Date of Patent: Apr. 6, 2004

(54) SYSTEM AND METHOD FOR PLAYING DVD BITSTREAM FROM NON-DVD OPTICAL STORAGE MEDIUM

(75) Inventor: John Alan Hague, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 10/020,503

(22) Filed: Dec. 18, 2001

(65) Prior Publication Data

US 2003/0113104 A1 Jun. 19, 2003

(51) Int. Cl.[7] .......................... H04N 5/781; H04N 5/85; H04N 7/04
(52) U.S. Cl. ...................... 386/125; 386/125; 386/105
(58) Field of Search ............................. 386/125, 126, 386/124, 45, 46, 1, 40, 70, 82, 104, 105, 106, 96; 369/13.96, 47.01; H04N 5/85, 5/781, 7/04

(56) References Cited

U.S. PATENT DOCUMENTS 5,734,787 A * 3/1998 Yonemitsu et al.
5,959,280 A * 9/1999 Kamatani

* cited by examiner

*Primary Examiner*—Robert Chevalier
(74) *Attorney, Agent, or Firm*—Joseph S. Tripoli; Harvey D. Fried; Francis A. Davenport

(57) ABSTRACT

The invention concerns a method (200) for playing data in a digital video disc (DVD) apparatus in which the data was recorded onto a non-DVD optical storage medium in a DVD format. The invention includes the steps of: determining (212) the physical type of the non-DVD optical storage medium; reading (214) a file structure contained on the non-DVD optical disc medium; and launching (216) a DVD video playback driver if the file structure on the non-DVD optical storage medium is a DVD file structure. In one arrangement, the physical type of the non-DVD optical storage medium can be determined by checking a focal length in which the focal length is defined by a laser and a reflective surface of the non-DVD optical storage medium. The invention also concerns a DVD apparatus (100) capable of playing data recorded on a non-DVD optical storage medium in a DVD format.

7 Claims, 2 Drawing Sheets

SYSTEM AND METHOD FOR PLAYING DVD BITSTREAM FROM NON-DVD OPTICAL STORAGE MEDIUM

BACKGROUND OF THE INVENTION

1. Technical Field

The inventive arrangements relate generally to video recording systems and more particularly to video recording systems that record digitally encoded video sequences onto storage media such as recordable optical storage media, hard drives and magneto optical discs.

2. Description of Related Art

Currently, several types of technology are available for individuals to record segments of audio, video or a combination thereof. As an example, many individuals use optical storage media technology such as digital video discs (DVD) or compact discs (CD) to record such segments. Notably, both CD's and DVD's are capable of receiving and storing audio as well as video. Further, recordable CD's such as CD-ROM's and CD-RW's can receive and store multimedia data recorded under a DVD format. Significantly, however, multimedia data that is recorded under a DVD format and stored on a recordable CD cannot be played back on a DVD player or DVD recorder because they currently cannot recognize DVD formatted data on anything but a DVD disc. Thus, consumers who wish to record a program or an event under the DVD format must record this data on a recordable DVD disc using a DVD recorder if they wish to play the data on a DVD player or DVD recorder.

Unfortunately, there are several economic drawbacks to the current limited approach. For instance, although available to consumers, DVD recorders are still relatively expensive, with some models costing thousands of dollars. Moreover, even if a consumer can afford a DVD recorder, the current price of a recordable DVD is significantly higher than the price of a recordable CD. Thus, a need exists for a method of permitting data recorded onto a recordable CD under a DVD format to be played on a DVD player and/or a DVD recorder without substantially increasing costs or the complexity of current DVD players and recorders.

SUMMARY OF THE INVENTION

The present invention concerns a method of playing data in a digital video disc (DVD) apparatus in which the data could be recorded onto a non-DVD optical storage medium in a DVD format. The method includes the steps of: determining the physical type of the non-DVD optical storage medium; reading a file structure contained on the non-DVD optical storage medium; and launching a DVD video playback driver if the file structure on the non-DVD optical storage medium is a DVD file structure. In one arrangement, the determining step can include the step of determining the physical type of the non-DVD optical storage medium by checking a focal length. This focal length can be defined by a laser and a reflective surface of the non-DVD optical storage medium.

In another arrangement, the launching step can further include the step of launching an audio playback driver if the file structure on the non-DVD optical storage medium is a CD file structure. Also, the DVD apparatus can be a DVD player or a DVD recorder.

The invention also concerns a method of permitting data recorded onto an optical storage medium under a digital video disc (DVD) format to be played in a DVD apparatus. The method includes the steps of: determining the physical type of the optical storage medium; reading a file structure contained on the optical storage medium; and launching a DVD video playback driver if the optical storage medium is a compact disc (CD) and the file structure on the optical storage medium is a DVD file structure. According to this method, the determining step can include the step of determining the physical type of the optical storage medium by checking a focal length.

In one arrangement, the launching step can include the step of launching a CD audio playback driver if the file structure on the optical storage medium is a CD file structure. Alternatively, the launching step can further include the step of launching a DVD video playback driver if the optical storage medium is a video DVD. In this method, the DVD apparatus can be a DVD player or a DVD recorder.

The present invention also concerns a digital video disc (DVD) apparatus capable of playing data recorded on a non-DVD optical storage medium in a DVD format. The DVD apparatus includes: a pickup assembly for determining the physical type of the non-DVD optical storage medium; a processor coupled to the DVD playback unit, programmed to: read a file structure contained on the non-DVD optical storage medium; and launch a DVD video playback driver if the non-DVD optical storage medium is a recognizable non-DVD optical storage medium and the file structure on the optical storage medium is a DVD file structure. In one arrangement, the recognizable non-DVD optical storage medium can be a compact disc (CD).

The invention also concerns a digital video disc (DVD) apparatus capable of playing data recorded in any of a plurality of digital formats from an optical storage medium. The DVD apparatus includes: a pickup assembly for determining the physical type of the optical storage medium; a processor coupled to the DVD player, programmed to: read a file structure contained on the optical storage medium; and selectively launch a playback driver among a plurality of playback drivers selected from the group of drivers including: a DVD video playback driver, a DVD audio playback driver, or a compact disc (CD) playback driver in which the DVD video playback driver can be launched if the optical storage medium is a CD and the file structure on the optical storage medium is a DVD file structure.

In one embodiment, the processor can be further programmed to selectively launch the CD playback driver if the optical storage medium is a DVD, and the file structure on the optical storage medium is a CD file structure. In addition, the processor can be further programmed to selectively launch the DVD audio playback driver if the optical storage medium is a DVD, and the file structure on the optical storage medium is a DVD audio file structure. Moreover, the processor can be further programmed to selectively launch the DVD video playback driver if the optical storage medium is a DVD, and the file structure on the storage medium is a DVD video file structure.

DETAILED DESCRIPTION

Figure 1:
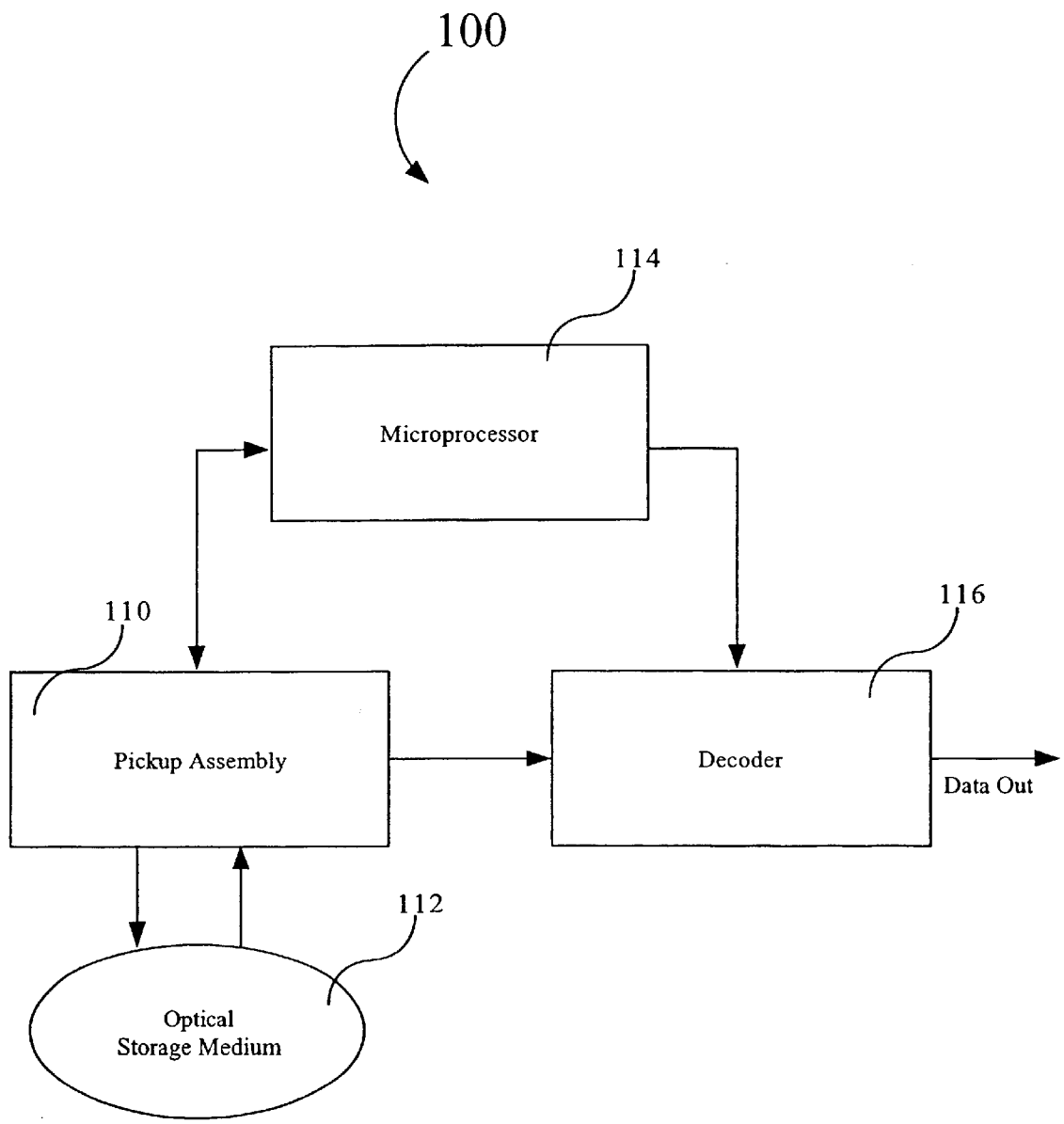
FIG. 1 is a block diagram of a system capable of playing a DVD bitstream from a non-DVD optical storage medium in accordance with the inventive arrangements.

A DVD apparatus 100 for implementing the various advanced operating features in accordance with the inventive arrangements is shown in block diagram form in FIG. 1. The invention, however, is not limited to the particular system illustrated in FIG. 1, as the invention can be practiced with any other suitable DVD apparatus. The DVD apparatus 100 can include a pickup assembly 110 for reading data from and writing data to an optical storage medium 112. The pickup assembly 110 can contain a laser (not pictured), a focus driver (not pictured) and suitable software and circuitry for determining the physical type of the optical storage medium 112. The focus driver can be used to focus the laser on the reflective surface of the optical storage medium to be read. The DVD apparatus 100 can also have a microprocessor 114 and a decoder 116 for decoding the data that is read from the optical storage medium 112. For purposes of the invention, the term data can include video, audio or a combination thereof. Control and data interfaces can also be provided for permitting the microprocessor 114 to control the operation of the decoder 116 and the pickup assembly 110.

The microprocessor 114 can also include one or more playback drivers. As an example, the microprocessor can contain a DVD video playback driver, a DVD audio playback driver and a CD playback driver. It is understood that the invention is not limited in this regard, however, as the DVD apparatus 100 can contain any other suitable type of playback driver. In addition, suitable software or firmware can be provided for the conventional operations performed by the microprocessor 118. Further, program routines can be provided for the microprocessor 118 in accordance with the inventive arrangements.

In operation, the focus driver of the pickup assembly 110 can attempt to focus the laser on the reflective surface of the optical storage medium 112. As is known in the art, the depth of the reflective surface is different for each of the various optical storage media. By evaluating a focus servo control signal or signals, the distance or focal length between the lens of the laser and the reflective disc surface can be determined. Thus having quantified the focus control signal, which is indicative of the focal length, software forming part of pickup assembly 110, can for example, by means of a look up table, determine the type of optical medium presented for reproduction. Once the physical type of optical storage medium 112 is determined, the pickup assembly 110 can signal microprocessor 114, and the microprocessor 114 can read a file structure contained on the optical storage medium 112. Based on the type of file structure read from the optical storage medium 112, the microprocessor 114 can launch an appropriate playback driver. This operation will be explained in greater detail in the next section.

PLAYING DVD BITSTREAM FROM NON-DVD OPTICAL STORAGE MEDIUM

Figure 2:
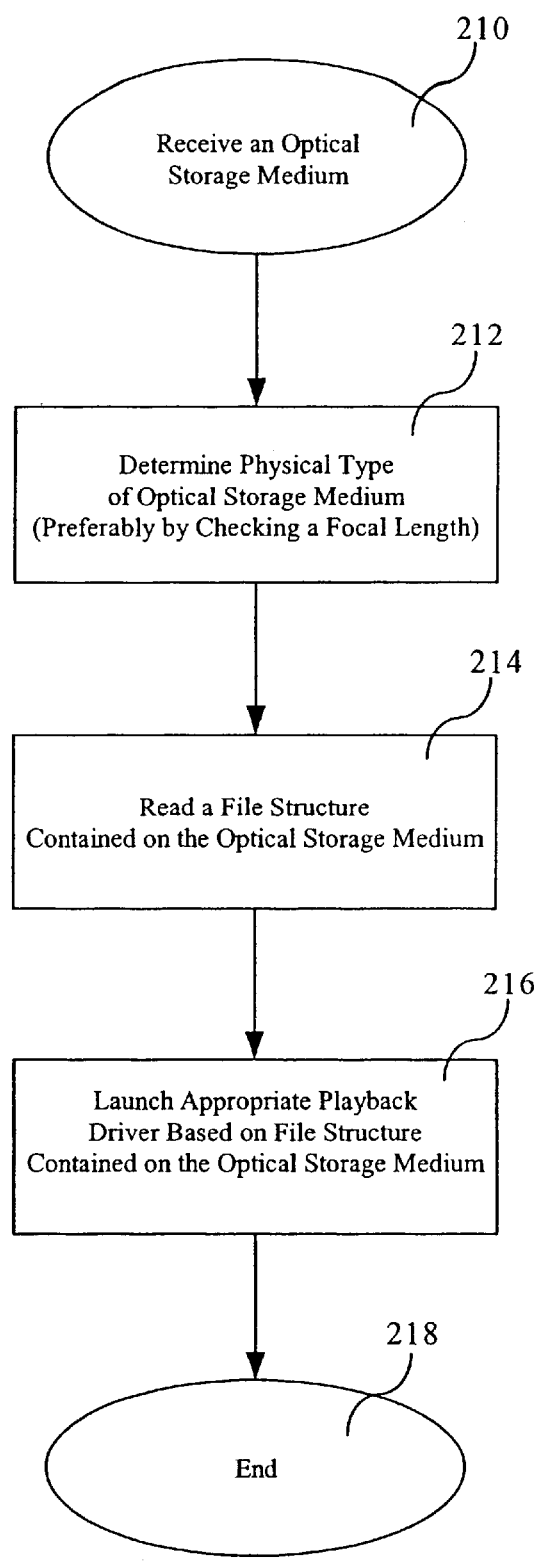
FIG. 2 is a flow chart that illustrates an operation of playing a DVD bitstream from a non-DVD optical storage medium in accordance with the inventive arrangements.

FIG. 2 illustrates a flowchart 200 that demonstrates one way of playing data in a DVD apparatus in which the data was recorded on a non-DVD optical storage medium in a DVD format. In one arrangement, the DVD apparatus can be a DVD player or a DVD recorder. At step 210, an optical storage medium can be received. As an example, the optical storage medium can be a DVD or a CD; however, it should be noted that the invention is not limited to these examples, as other suitable types of storage media can be used so long as the optical disc medium is a recognizable optical storage medium. At step 212, the physical type of the optical storage medium can be determined. In one arrangement, this determining step can be performed by checking a focal length. This focal length can be defined by a laser and a reflective surface of the optical storage medium. For example, the focal length for a CD is different from that of a DVD. This difference can be used to distinguish a CD from a DVD and vice-versa. It is understood, however, that the invention is not limited to this particular method of differentiating between optical storage media, as other suitable techniques can be used.

At step 214, a file structure contained on the optical storage medium can be read to determine the logical type of the optical storage medium. This process can determine the logical type of the optical storage medium. As an example, the directory structure and one or more file names in the file structure can be read to determine the logical type of the optical storage medium. The invention is not limited to this particular example, however, as other suitable methods of determining the logical type of the optical storage medium can be used and other suitable file structures can be read to practice the invention. At step 216, an appropriate playback driver can be launched once the logical type of the optical storage medium is determined.

In one arrangement, if the optical storage medium is a non-DVD optical storage medium, and the file structure on the non-DVD optical storage medium is a DVD file structure, a DVD video playback driver can be launched to play the DVD bitstream recorded on the non-DVD optical storage medium. As an example, the non-DVD optical storage medium can be a CD onto which a DVD bitstream has been recorded. Thus, the invention enables reproduction by a DVD apparatus, such as a DVD recorder or DVD player, of data recorded on a CD using a DVD format. In addition, if the non-DVD optical storage medium is a CD and the file structure is a CD file structure, then a CD audio playback driver may be launched. The invention also can launch an appropriate playback driver if the optical storage medium is a DVD. For example, if the optical storage medium is a DVD and the file structure is a DVD video file structure, then the DVD video playback driver can be launched. Further, if the file structure on the DVD is an DVD audio file structure, then a DVD audio playback driver can be launched. It is understood, however, that the invention is not limited to these examples, as other appropriate playback drivers can be launched based on the physical and logical type of the optical storage medium that is to be played. Finally, flowchart 200 can end at step 218.

Although the present invention has been described in conjunction with the embodiments disclosed herein, it should be understood that the foregoing description is intended to illustrate and not limit the scope of the invention as defined by the claims.

What is claimed is:

1. A method of playing data in a digital video disc (DVD) apparatus, wherein the data can be recorded onto a non-DVD optical storage medium in a DVD format, comprising the steps of:

determining the physical type of the non-DVD optical storage medium by checking a focal length;

reading a file structure contained on the non-DVD optical storage medium; and launching a DVD video playback driver if the file structure on the non-DVD optical storage medium is a DVD file structure.

2. The method according to claim 1, wherein said determining step comprises the step of determining if the non-DVD optical storage medium is a compact disc (CD) by checking the focal length defined by a laser and a reflective surface of the non-DVD optical storage medium.

3. The method according to claim 2, wherein said launching step further comprises the step of launching an audio playback driver if the file structure on the non-DVD optical storage medium is a CD file structure.

4. A digital video disc (DVD) apparatus of capable of playing data recorded in any of a plurality of digital formats from an optical storage medium, comprising:
- a pickup assembly for determining the physical type of the optical storage medium;
- a processor is coupled to the DVD player, programmed to:
  - read a file structure contained on the optical storage medium; and
  - selectively launch a playback driver among a plurality of playback drivers selected from the group of drivers comprising a DVD video playback driver, a DVD audio playback driver, or a compact disc (CD) playback driver, wherein the DVD video playback driver is launched if the optical storage medium is a CD and the file structure on the optical storage medium is a DVD file structure, or the CD playback driver is launched if the optical storage medium is a DVD and the file structure on the optical storage medium is a CD file structure.

5. A digital video disc (DVD) apparatus of capable of playing data recorded in any of a plurality of digital formats from an optical storage medium, comprising:
- a pickup assembly for determining the physical type of the optical storage medium;
- a processor is coupled to the DVD player, programmed to:
  - read a file structure contained on the optical storage medium; and
  - selectively launch a playback driver among a plurality of playback drivers selected from the group of drivers comprising a DVD video playback driver, a DVD audio playback driver, or a compact disc (CD) playback driver, wherein the DVD video playback driver is launched if the optical storage medium is a CD and the file structure on the optical storage medium is a DVD file structure, or the DVD audio playback driver is launched if the optical storage medium is a DVD and the file structure on the optical storage medium is a DVD audio file structure.

6. The DVD apparatus of claim 4, wherein the processor is further programmed to selectively launch the DVD video playback driver if the optical storage medium is a DVD and the file structure on the storage medium is a DVD video file structure.

7. A method of permitting data recorded on an optical storage medium having a digital video disc (DVD) format to be played in a DVD apparatus comprising the steps of:
- determining the physical type of the optical storage medium by checking a focal length;
- reading a file structure contained on the optical storage medium; and
- launching a DVD video playback driver if the optical storage medium is a compact disc (CD) and the file structure on the optical storage medium is a DVD file structure.

* * * * *